Sept. 18, 1928.
A. GNUDI
1,684,795
DISPLAY METHOD
Filed Oct. 3, 1924
2 Sheets-Sheet 1
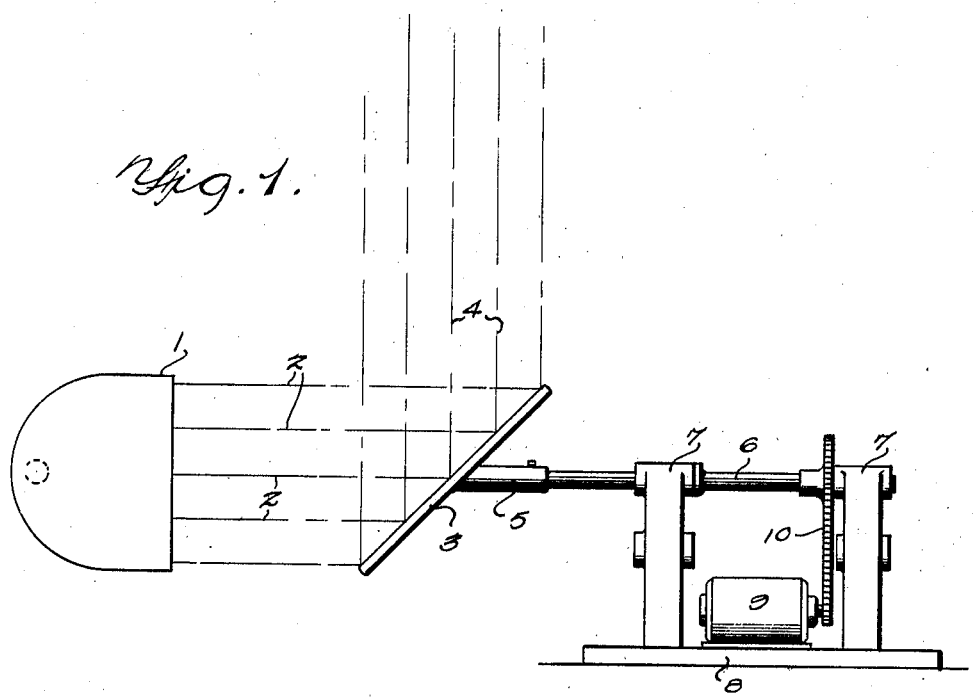
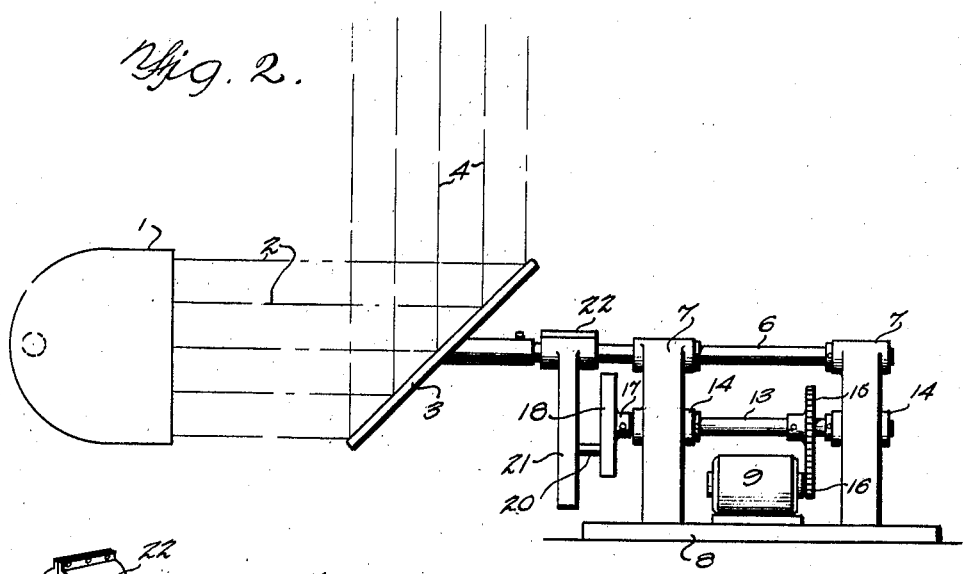
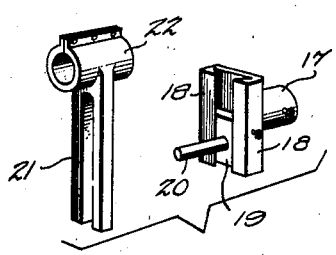
Inventor
Alfonso Gnudi
By
Attorney Sept. 18, 1928.

A. GNUDI 1,684,795

DISPLAY METHOD

Filed Oct. 3, 1924    2 Sheets-Sheet 2

Inventor
Alfonso Gnudi
By
Attorney

Patented Sept. 18, 1928.

1,684,795

UNITED STATES PATENT OFFICE.

ALFONSO GNUDI, OF BOLOGNA, ITALY.

DISPLAY METHOD.

Application filed October 3, 1924. Serial No. 741,482.

This invention relates to display methods, and more particularly to a luminous system of display for use in advertising and the like.

In practicing the process, I employ two sets of rays of light of different color projected at an angle to each other, causing them to intersect and produce the desired result at the point of intersection.

More specifically, the light rays forming the background are projected against a revolving mirror or the like to rotate them and the rays reflected from the mirror form a luminous surface in the atmosphere on which rays of light of another color are then projected to form the desired design.

In the accompanying drawings, I have shown several forms of apparatus capable of use in practicing the process and have diagrammatically illustrated several of the displays obtained in practicing the process. In this showing:

Figure 1 is a side elevation of one form of apparatus,

Figure 2 is a side elevation of another form of apparatus,

Figure 3 is a detail perspective view of part of the drive mechanism shown in Figure 2.

Figure 4:
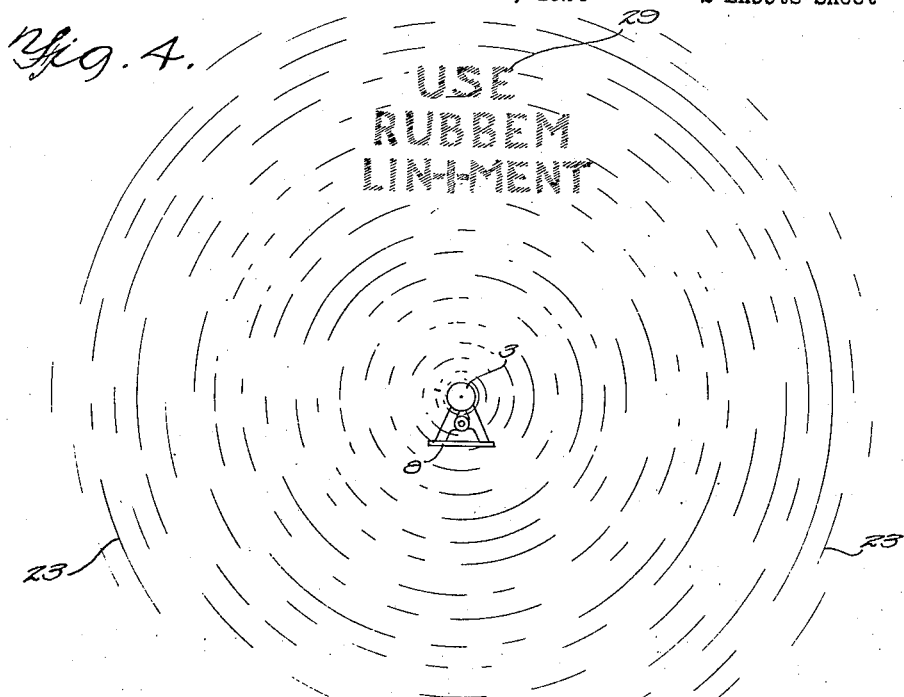
Figure 4 is a plan view of one display.

Referring to Figure 1 of the drawings, the reference numeral 1 designates a light projector of any desired type. This projector is adapted to project rays of light 2 which strike upon the surface of a mirror 3. The reflected rays from the face of the mirror are indicated by the reference numeral 4. The mirror 3 is arranged at an angle of 45°, as shown, and is also adapted to revolve. As shown, a sleeve 5 is secured to the back of the mirror and this sleeve is mounted on the end of a drive shaft 6. The shaft 6 is supported in suitable bearings 7 carried by a base 8. A motor 9 is mounted on the base. The motor shaft is provided with a sprocket adapted to receive a chain 10 passing over a sprocket wheel 12 on the shaft 6 to drive the shaft.

In the form of the invention shown in Figures 2 and 3 of the drawings, the shaft 6 is not directly connected to the motor. An intermediate shaft 13 is arranged in bearings 14 beneath the shaft 6, and this intermediate shaft is provided with a gear 15, meshing with a pinion 16 on the motor shaft. A sleeve 17 (see Figure 3) is mounted on the end of the shaft 13 and this sleeve is provided with suitable guides adapted to receive a block 19. This block 19 carries a pin 20 adapted to be received in a bifurcated arm 21 carried by a sleeve 22, mounted on the shaft 6.

Figure 5:
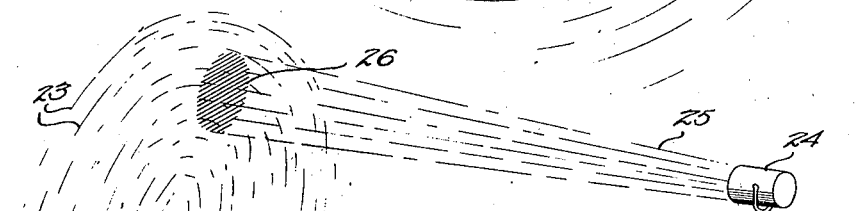
Figure 5 is a perspective view of another display showing the secondary reflector.
Figure 6:
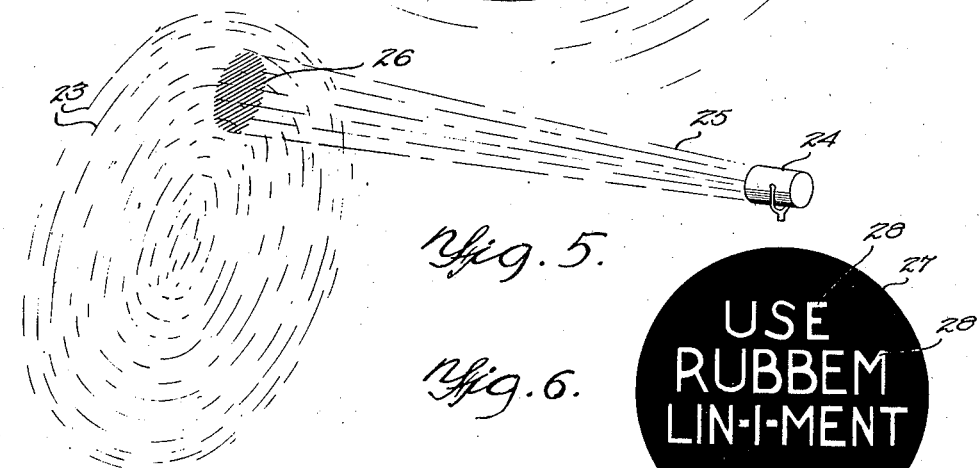
Figure 6 is a front elevation of a disk employed in the secondary projector, and, Figure 7 is a vertical sectional view of the projector.
Figure 7:
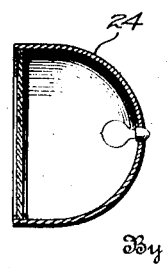

Referring to Figures 4 and 5 of the drawings, the reference numeral 23 designates a luminous surface produced by the rays 4. A secondary projector 24 is arranged at any convenient point and is adapted to project rays of light 25 at an angle to the rays of light 4 so as to intercept the rays of light 4 and produce a design indicated by the reference numeral 26, on the luminous surface 23. In Figure 6 of the drawings, I have shown a disk 27 adapted to be arranged over the face of the secondary projector 24 and formed of non-transparent material. The disk may be provided with perforations or cut-out portions 28 to produce letters or other characters to form a desired design. In Figure 4 of the drawings, the design of advertising display 29 that is produced by the disk 27 is shown.

By revolving the mirror 3 or by passing the rays of light 2 through a revolving transparent member, the reflected rays continually change their position in a vertical plane. This produces the luminous surface 23 and the rays of light 25 from the secondary projector are arranged at a suitable angle to the rays of light 4 to intersect them and are of a different color. By producing rays of light of a desired design by means of the disk 27, or similar apparatus, the character of the design 29 may be changed at will. The process is thus particularly useful for luminous advertising, displaying a desired advertising design in the sky at night where it may be readily seen by a number of people. By shifting the direction of the rays of light 4, the advertising may be shown at various points over a city and thus brought to the attention of practically every inhabitant of the city.

It is to be understood that the forms of my invention herewith shown and described are to be taken as preferred examples of the same, and that various changes in the shape, size, and arrangement of parts may be resorted to without departing from the spirit of the invention or the scope of the subjoined claims.

I claim:

1. The herein described method which comprises projecting a beam of light into the atmosphere and moving it rapidly and continuously over a given area in the same plane to create in effect a screen of light of substantial area, and projecting a set of light rays of another color against such screen at an angle thereto and at points where there is no abnormal presence of particles by which the paths of the light rays may be traced.

2. The herein described method which comprises projecting a beam of light into the atmosphere and moving it rapidly and continuously over a given area in the same plane to create in effect a screen of light of substantial area, and projecting a set of light rays having a cross sectional shape of desired design against such screen at an angle thereto and at points where there is no abnormal presence of foreign particles by which the paths of the light rays may be traced.

In testimony whereof I affix my signature.

ALFONSO GNUDI.